US012786717B2

(12) United States Patent
Sanghvi et al.

(10) Patent No.: US 12,786,717 B2
(45) Date of Patent: Nov. 3, 2026

(54) UWB-BASED QUANTUM TOKENIZED COMMUNICATION FRAMEWORK FOR SECURE AND EFFICIENT TRANSACTIONS

(71) Applicant: Bank of America Corporation, Charlotte, NC (US)

(72) Inventors: Siten Sanghvi, Westfield, NJ (US); Naga Vamsi Krishna Akkapeddi, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 85 days.

(21) Appl. No.: 19/041,470

(22) Filed: Jan. 30, 2025

(65) Prior Publication Data

US 2026/0222815 A1 Jul. 30, 2026

(51) Int. Cl.
*H04W 12/106* (2021.01)
*H04L 9/32* (2006.01)
(Continued)

(52) U.S. Cl.
CPC ......... *H04W 12/106* (2021.01); *H04L 9/3213* (2013.01); *H04L 63/123* (2013.01); *H04W 12/64* (2021.01)

(58) Field of Classification Search
CPC .. H04W 12/106; H04W 12/64; H04L 63/123; H04L 9/3213
See application file for complete search history.

(56) References Cited

U.S. PATENT DOCUMENTS 10,224,999 B2 3/2019 Rappaport
11,115,012 B2 9/2021 Cohen et al.
(Continued)

OTHER PUBLICATIONS

Jeong, Seon-Geun; Do, Quang-Vinh; Hwang, Hae-Ji; Hasegawa, Mikio; Sekiya, Hiroo; Hwang, Won-Joo; "Hybrid Quantum Convolutional Neural Networks for UWB Signal Classification," IEEE Access, vol. 11, Oct. 9, 2023, pp. 113726-113739.*
(Continued)

*Primary Examiner* — Victor Lesniewski
(74) *Attorney, Agent, or Firm* — Banner & Witcoff, Ltd.

(57) ABSTRACT

An Ultra-Wide Band (UWB)-based communication framework integrates quantum cloud orchestration and tokenized security to enable secure, efficient, and low-latency transactions between devices and edge centers. The system dynamically generates quantum-encrypted, perishable tokens containing transaction metadata, including geolocation, network type, and security requirements, to optimize data transfer. The framework employs UWB technology for precise location tracking and low-energy communication, enabling seamless hybrid network integration across UWB, 5G, and Wi-Fi. The quantum cloud orchestrator leverages AI and machine learning to predict network conditions, optimize transaction paths, and pre-communicate metadata for real-time processing. Using Software-Defined Networking (SDN), the system ensures secure and efficient routing while maintaining compliance with regulatory standards. Applications span diverse sectors, including smart workplaces, contactless retail, dynamic ticketing, personalized hospitality, and emergency response coordination. This invention addresses critical challenges in signal strength, energy consumption, and latency, offering a scalable, transformative solution for secure and efficient device-edge communication.

20 Claims, 4 Drawing Sheets

Sample System Architecture Diagram

(51) Int. Cl.
*H04L 9/40* (2022.01)
*H04W 12/64* (2021.01)

(56) References Cited

U.S. PATENT DOCUMENTS

| | | | | |
|---|---|---|---|---|
| 11,502,843 | B2 | 11/2022 | Schat | |
| 2007/0242729 | A1 | 10/2007 | Quinn et al. | |
| 2016/0099866 | A1 * | 4/2016 | Stellick | H04L 45/22 370/225 |
| 2017/0223094 | A1 | 8/2017 | Johnson et al. | |
| 2017/0262659 | A1 * | 9/2017 | Kuris | G06F 21/6227 |
| 2019/0102220 | A1 * | 4/2019 | Bishop | G06F 9/4843 |
| 2019/0319986 | A1 * | 10/2019 | Srinivasan | H04L 43/028 |
| 2019/0386969 | A1 * | 12/2019 | Verzun | G06F 21/606 |
| 2020/0014526 | A1 | 1/2020 | Hammerschmidt et al. | |
| 2020/0022074 | A1 * | 1/2020 | Shimojou | H04W 48/18 |
| 2020/0371191 | A1 * | 11/2020 | Delibie | G01S 5/0252 |
| 2021/0185445 | A1 * | 6/2021 | Sabatier | H04B 1/7163 |
| 2022/0014566 | A1 * | 1/2022 | Guim Bernat | H04L 63/205 |
| 2022/0038335 | A1 * | 2/2022 | Barton | H04L 67/125 |
| 2022/0189224 | A1 | 6/2022 | Pirch et al. | |
| 2022/0209943 | A1 | 6/2022 | Syrivelis et al. | |
| 2022/0264172 | A1 * | 8/2022 | Matsimanis | H04W 4/021 |
| 2023/0097712 | A1 | 3/2023 | Sullivan et al. | |
| 2023/0171729 | A1 | 6/2023 | Oh et al. | |
| 2024/0031224 | A1 * | 1/2024 | Stockert | H04B 10/70 |
| 2024/0236698 | A1 * | 7/2024 | Lanfranchi | H04W 12/104 |
| 2024/0265390 | A1 * | 8/2024 | Dhar | G06F 21/602 |
| 2024/0291728 | A1 * | 8/2024 | Halstead | H04L 41/40 |
| 2024/0306073 | A1 * | 9/2024 | Muthuraman | H04B 7/18519 |
| 2024/0330735 | A1 | 10/2024 | Shi et al. | |
| 2024/0388592 | A1 * | 11/2024 | Dash | H04L 63/1425 |
| 2025/0133066 | A1 * | 4/2025 | Rangaraj | H04L 9/14 |
| 2025/0168002 | A1 * | 5/2025 | Blackburn | H04L 9/50 |
| 2025/0287215 | A1 * | 9/2025 | Vaughn | H04L 63/107 |
| 2025/0292253 | A1 * | 9/2025 | Gilchrist | G06F 21/602 |

OTHER PUBLICATIONS

Ahmad, Syed Farhan; Ferjani, Mohamed Yassine; Kasliwal, Keshav; "Enhancing Security in the Industrial IoT Sector using Quantum Computing," 28th International Conference on Electronics, Circuits, and Systems (ICECS), Dubai, United Arab Emirates, Nov. 28-Dec. 1, 2021, IEEE, pp. 1-5.*

Petukhov, N.I.; Orobchenko, S.V.; Kochka, K.V.; Evseev, A.D.; Zamolodchikov, V.N.; Glukhov, O.V.; "Synthesis and Performance Analysis of UKF for Processing Measurements of UWB ToF/AoA LNS with Long Baseline and IMU," XVI Int'l Sci&Tech Conf APEIE , Novosibirsk, RF, Nov. 10-12, 2023, IEEE, pp. 780-785.*

* cited by examiner

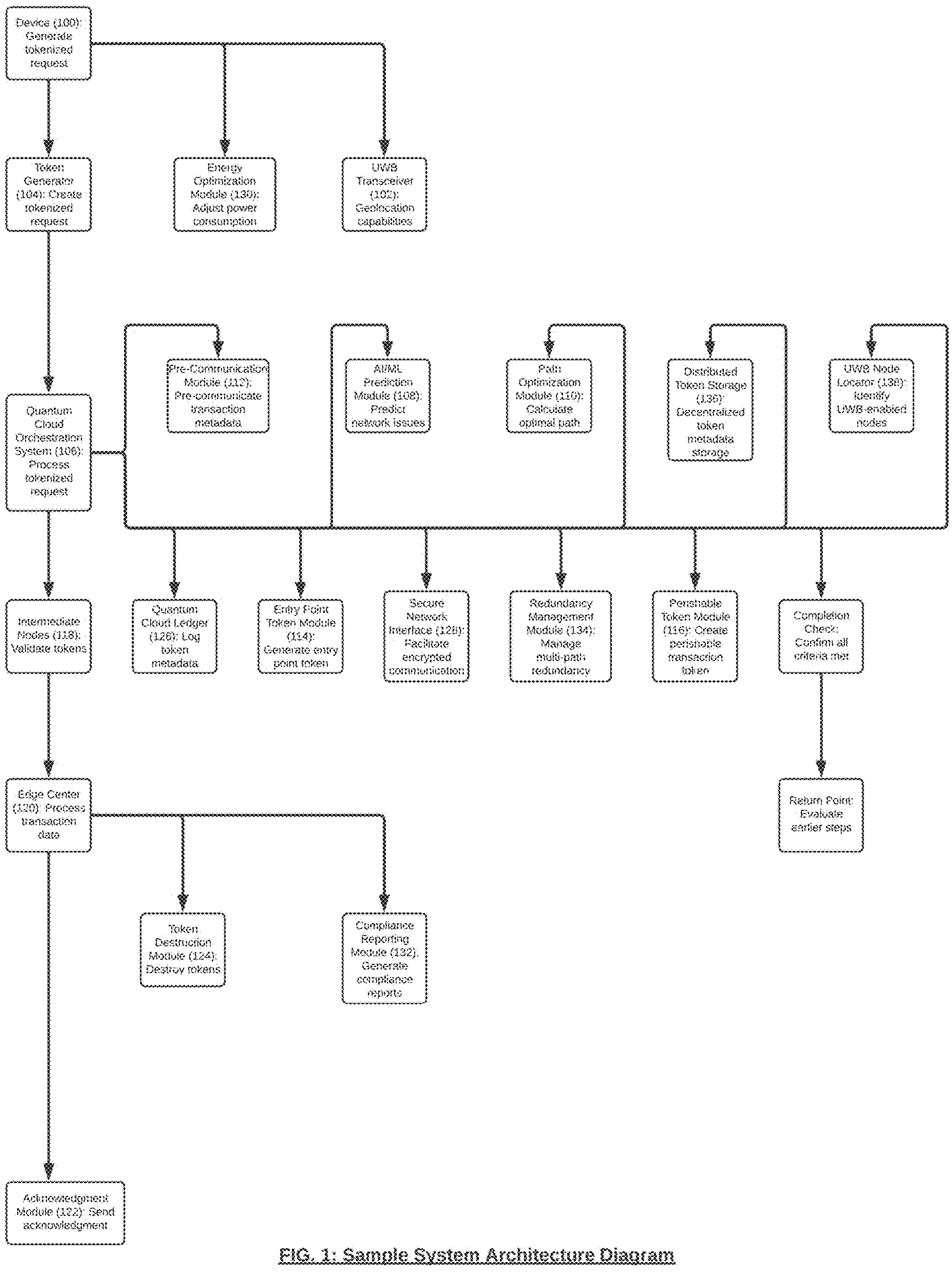
FIG. 1: Sample System Architecture Diagram

FIG. 2: Sample Flow Diagram

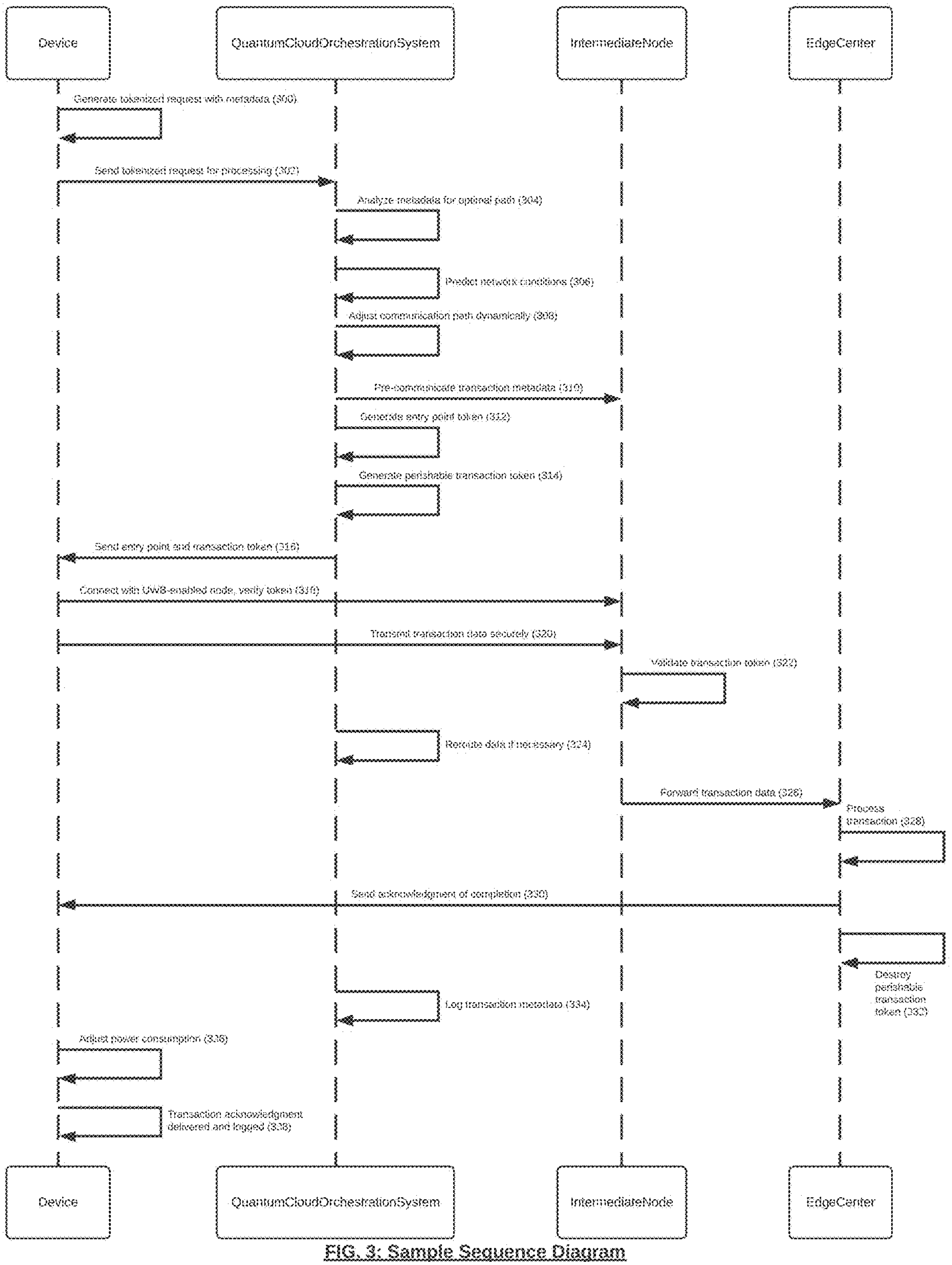
FIG. 3: Sample Sequence Diagram

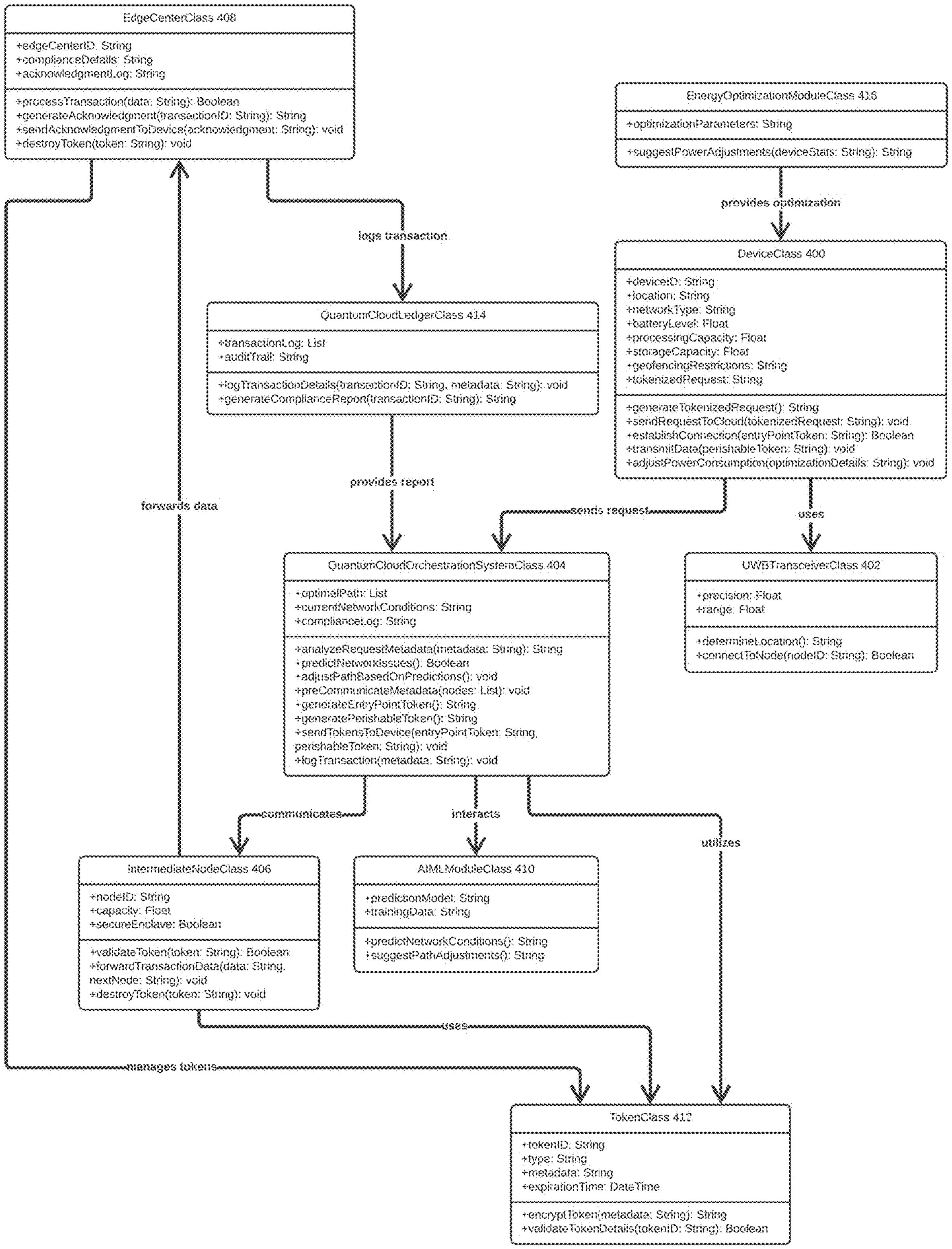
FIG. 4: Sample Class Diagram

UWB-BASED QUANTUM TOKENIZED COMMUNICATION FRAMEWORK FOR SECURE AND EFFICIENT TRANSACTIONS

TECHNICAL FIELD

The invention disclosed herein pertains to multiplex communications, telephonic communications, cryptography, telecommunications, and information security. The invention improves the transmission of multiple signals over hybrid networks by dynamically routing secure and efficient communications using Ultra-Wide Band (UWB) technology, Wi-Fi, and 5G. It enhances device-to-edge communications by integrating low-latency and energy-efficient mechanisms for data exchange, particularly in systems requiring real-time coordination and compliance with regulatory standards. Employing advanced cryptographic techniques, including quantum-encrypted, perishable tokens, the invention ensures end-to-end security and traceability of sensitive transactions, addressing key concerns in data protection and integrity. Additionally, it advances telecommunication systems by optimizing network resources, reducing signal degradation, and enabling seamless handoffs between heterogeneous networks. The invention also strengthens information security through methods that ensure the availability, confidentiality, and integrity of digital data while enabling compliance with data protection regulations across diverse applications.

DESCRIPTION OF THE RELATED ART

Modern communication systems face numerous challenges when facilitating transactions between devices and edge centers, particularly in environments with limited network resources, high latency, and stringent security requirements. The proliferation of edge computing, IoT devices, and advanced telecommunications networks has enabled remarkable progress, but it has also revealed significant limitations. Signal degradation is one of the most prominent issues, as devices in remote areas or dense urban environments often experience dropped connections and reduced bandwidth due to obstacles, interference, or physical distance from network towers or edge nodes. This results in critical disruptions for applications that demand low-latency communication, such as financial transactions, emergency response, or industrial automation.

Another pressing issue involves the high energy consumption of battery-powered IoT devices and wearables. These devices often struggle to maintain stable network connections in weak signal conditions, which leads to a rapid depletion of their limited power reserves. The constant search for stable connections is particularly problematic in scenarios requiring sustained communication, as it directly impacts the device's operational lifespan and reliability. This energy inefficiency poses a severe limitation for the deployment of IoT devices in critical applications, such as smart cities and remote industrial operations, where continuous connectivity is essential.

Latency remains a significant obstacle, particularly in multi-network transactions that involve transitions between different communication protocols, such as UWB, cellular, and Wi-Fi. The lack of seamless handoffs and pre-coordinated network integration forces devices to restart connections, causing delays and inefficiencies. In scenarios where multiple devices interact or relay information across various networks, the resulting latency can severely disrupt the intended operations. This challenge is exacerbated in high-density environments with numerous active devices competing for network resources, further complicating the process of reliable data exchange.

Security and privacy concerns add another layer of complexity. Modern communication systems often lack robust mechanisms to protect data during transmission. Unauthorized access, data interception, and tampering remain prevalent risks, particularly in financial and other sensitive transactions. Many existing systems fail to implement end-to-end encryption and real-time authentication, leaving critical data vulnerable to malicious actors. These vulnerabilities undermine trust in IoT-enabled systems and discourage the adoption of advanced digital solutions across industries.

The challenge of ensuring regulatory compliance further complicates the landscape of secure communication. Data protection regulations, such as GDPR and PCI DSS, impose stringent requirements on how data is handled, stored, and transmitted. Existing systems often struggle to meet these requirements while maintaining efficient communication workflows. This limitation hinders the deployment of IoT solutions in industries with strict compliance mandates, such as finance and public safety, where the stakes for security and privacy are particularly high.

Another problem arises from the fragmented nature of current communication systems. Devices are often required to independently negotiate network connectivity and determine transaction paths without coordination, leading to inefficient use of resources and increased transaction failure rates. This decentralized approach creates significant inefficiencies, as devices cannot leverage the broader network ecosystem to optimize their communication processes. Such fragmentation limits the scalability and adaptability of existing communication infrastructures.

The lack of interoperability between different network types poses further challenges. Modern communication environments often involve heterogeneous networks with varying protocols, architectures, and capabilities. The absence of a unified framework to facilitate seamless transitions between these networks results in connection disruptions, inefficiencies, and inconsistent service quality. This challenge is particularly pronounced in industries that rely on real-time, high-volume data exchange, such as logistics, manufacturing, and telecommunications.

Inconsistent location tracking capabilities compound the problem, especially in applications requiring precise geospatial data. Many existing communication systems lack the ability to accurately determine the physical location of devices, leading to inefficiencies in resource allocation and routing. This limitation is critical in scenarios such as emergency response, asset tracking, and location-based services, where real-time and accurate location information is indispensable.

The absence of robust mechanisms for prioritizing and managing transactions based on their criticality further aggravates the challenges. Current systems often treat all transactions equally, failing to account for the varying levels of urgency, security, and resource requirements associated with different use cases. This lack of prioritization leads to suboptimal resource allocation and delays in processing high-priority transactions, particularly in high-stakes applications such as financial systems or emergency services.

Limited scalability in existing communication infrastructures hinders their ability to accommodate the growing volume of IoT devices and data traffic. As the number of connected devices continues to rise, traditional systems struggle to maintain performance, security, and efficiency under increased load. This scalability bottleneck restricts the expansion of IoT ecosystems and limits their potential to deliver transformative benefits across industries.

Existing solutions also fail to provide adequate traceability and accountability for transactions. The inability to track the origin, destination, and intermediary steps of data transfers undermines transparency and trust in communication systems. This lack of traceability is particularly problematic in regulated industries, where auditing and reporting requirements demand comprehensive records of all transactional activities.

The inefficiencies of current communication systems also create barriers to innovation and the adoption of emerging technologies. The limitations in latency, security, scalability, and energy efficiency discourage organizations from investing in IoT-enabled solutions, stifling their ability to leverage these technologies for operational improvements. This inertia prevents industries from realizing the full potential of advanced communication frameworks.

The global reliance on outdated communication models further exacerbates these problems. Many existing systems were not designed to handle the complexities of modern IoT ecosystems, which involve dynamic, multi-network environments with diverse application requirements. The lack of forward-thinking design and integration capabilities results in an inability to address the demands of contemporary communication challenges effectively.

The challenges outlined above have persisted for years, highlighting a long-felt and unmet need for an innovative solution that addresses these limitations comprehensively. Industries have struggled to deploy reliable, secure, and efficient communication systems that can meet the demands of modern applications. The need for a transformative approach that resolves these issues while enabling scalable, energy-efficient, and secure communication has become increasingly urgent as the number of connected devices and data-driven applications continues to grow.

SUMMARY OF THE INVENTION

The invention is a sophisticated communication framework that integrates Ultra-Wide Band technology, quantum cloud orchestration, and tokenized security to facilitate secure, efficient, and low-latency communication between devices and edge centers. This system leverages cutting-edge technologies to address critical challenges in modern communication environments, including signal strength issues, latency, energy constraints, and security vulnerabilities. The core design of the invention ensures that transactions are conducted with maximum reliability, scalability, and compliance with regulatory requirements, making it a transformative solution for a wide range of industries and applications.

At the center of the system is the use of Ultra-Wide Band technology, which provides precise geolocation capabilities with centimeter-level accuracy. This precision enables the system to identify nearby UWB-enabled nodes and access points capable of supporting the transaction. The low-energy characteristics of UWB make it ideal for battery-constrained devices such as IoT sensors, wearables, and other mobile technologies, significantly reducing power consumption while maintaining robust connectivity. These attributes ensure that the system can operate effectively in diverse and resource-constrained environments.

Another key component of the invention is its reliance on quantum cloud orchestration. The quantum cloud serves as the central intelligence layer, analyzing transaction metadata to determine the most optimal communication path between the device and the edge center. Using artificial intelligence and machine learning algorithms, the quantum cloud predicts network conditions, identifies potential bottlenecks, and dynamically allocates resources to ensure seamless communication. This orchestration capability enables real-time optimization of transaction paths, reducing latency and improving overall system performance.

The system employs a tokenized security framework to authenticate and authorize transactions. Each transaction is associated with two dynamically generated tokens: an entry point token and a perishable transaction token. The entry point token provides the device with the details of the initial UWB-enabled node for establishing the communication path. The perishable transaction token, encrypted using quantum-safe cryptographic algorithms, contains metadata necessary for authenticating and authorizing the transaction. The time-bound nature of these tokens ensures that they expire after a predefined duration or upon transaction completion, providing an additional layer of security against unauthorized access or reuse.

A unique feature of the invention is its ability to pre-communicate transaction metadata to intermediate nodes along the communication path. This pre-communication ensures that all nodes are prepared for the incoming transaction, reducing processing times and enabling low-latency data transfer. The intermediate nodes validate the tokens at each step to maintain the integrity and security of the transaction. This validation process ensures that only authorized transactions are processed and that sensitive data remains protected throughout its journey.

The invention's ability to handle multi-path redundancy is another critical aspect. The system can split transaction data into multiple paths for transmission, providing redundancy to guarantee delivery even in cases of network congestion or node failure. The quantum cloud dynamically reroutes transaction data in real time, based on its AI-driven predictions of network conditions. This redundancy mechanism enhances the reliability and robustness of the system, particularly in high-density or critical application environments.

Compliance with regulatory standards such as GDPR and PCI DSS is embedded in the system's design. The tokenized framework ensures that data is encrypted and stored only for the duration of the transaction, meeting stringent data protection and privacy requirements. Additionally, the system incorporates geofencing rules into the tokenized metadata, allowing transactions to be restricted to specific geographic regions. These features make the invention highly suitable for applications in regulated industries such as finance, healthcare, and logistics.

The system includes mechanisms for logging transaction metadata in a secure ledger maintained by the quantum cloud. This ledger provides an immutable audit trail, enabling traceability and accountability for all transactions. The use of distributed ledger technology further enhances the transparency and security of the system, ensuring that all transaction activities are auditable and tamper-proof. This capability is particularly valuable in industries requiring rigorous compliance and reporting.

Energy efficiency is a core consideration of the invention, particularly for IoT devices and wearables. By offloading computationally intensive tasks such as token generation and path optimization to the quantum cloud, the system minimizes the energy consumption of individual devices. This design feature extends the operational lifespan of connected devices and supports their deployment in resource-constrained or remote environments where frequent recharging is not feasible.

The invention is designed for scalability, accommodating the growing volume of connected devices and data traffic in modern communication ecosystems. Its modular architecture allows it to integrate seamlessly with existing infrastructure and adapt to future technological advancements. This scalability ensures that the system can support large-scale deployments in diverse environments, from smart cities and industrial automation to global supply chains and emergency response systems.

The invention's hybrid network integration is another standout feature, combining the precision of UWB with the reach of traditional networks such as 5G and Wi-Fi. This integration ensures seamless transitions between different network types, enabling uninterrupted communication even in complex or heterogeneous network environments. The system's ability to maintain consistent performance across diverse conditions makes it a versatile solution for a wide range of applications.

One of the unique aspects of the invention is its focus on user-specific customization. The tokenized framework allows for the inclusion of device-specific parameters such as battery level, processing capability, and storage capacity. These parameters are used by the quantum cloud to tailor the communication path and optimize resource allocation based on the unique requirements of each device. This customization capability enhances the adaptability and effectiveness of the system.

The invention also supports dynamic role-based access control, allowing transactions to be restricted based on user roles, device types, or temporal conditions. This feature provides fine-grained control over transaction permissions, ensuring that only authorized users or devices can initiate or process transactions. Such control mechanisms enhance security and reduce the risk of unauthorized access.

Applications of the invention span multiple domains, including secure access control in smart workplaces, contactless retail shopping, dynamic ticketing for public transport, personalized hospitality experiences, and emergency response coordination. The system's ability to securely and efficiently manage transactions in real time makes it a valuable tool for enhancing operational efficiency and user experience across various industries.

Overall, the invention represents a transformative approach to communication challenges, combining advanced technologies to deliver secure, efficient, and scalable solutions. Its focus on energy efficiency, tokenized security, real-time orchestration, and regulatory compliance sets it apart from existing systems, making it a pioneering innovation in the field of device-to-edge communication. By addressing critical pain points and providing a robust, future-proof framework, the invention establishes a new standard for secure and efficient communication.

In light of the foregoing, the following provides a simplified summary of the present disclosure to offer a basic understanding of its various parts. This summary is not exhaustive, nor does it limit the exemplary aspects of the inventions described herein. It is not designed to identify key or critical elements or steps of the disclosure, nor to define its scope. Rather, it is intended, as understood by a person of ordinary skill in the art, to introduce some concepts of the disclosure in a simplified form as a precursor to the more detailed description that follows. The specification throughout this application contains sufficient written descriptions of the inventions, including exemplary, non-exhaustive, and non-limiting methods and processes for making and using the inventions. These descriptions are presented in full, clear, concise, and exact terms to enable skilled artisans to make and use the inventions without undue experimentation, and they delineate the best mode contemplated for carrying out the inventions.

In some arrangements, a method is provided for facilitating secure and efficient communication between a device and an edge center using a tokenized framework. The method includes receiving, at a quantum cloud orchestration system, a tokenized request generated by a device, wherein the device is experiencing one or more of weak signal strength, high latency, or excessive energy consumption. The tokenized request includes metadata specifying a transaction type, a geolocation determined using ultra-wide band (UWB) technology, a current network type, destination details, and security requirements. The quantum cloud orchestration system analyzes the metadata to determine an optimal communication path from the device to the edge center, the optimal path being based on network availability, latency, and the capabilities of intermediate nodes. The quantum cloud orchestration system pre-communicates transaction metadata to the intermediate nodes along the communication path to prepare the nodes for low-latency processing and secure data transmission.

The system generates an entry point token specifying an initial UWB-enabled node for establishing the communication path and a perishable transaction token encrypted using quantum-safe cryptographic algorithms. The perishable transaction token contains encrypted metadata for authenticating and authorizing the transaction and is time-bound, expiring after a predefined duration or upon completion of the transaction. The quantum cloud orchestration system transmits the entry point token and the perishable transaction token to the device for use in initiating and conducting the transaction. The device establishes a connection to the identified UWB-enabled node using the entry point token, which includes a timestamp indicating when the token becomes valid and an expiration time. The device initiates the transaction by securely transmitting transaction data through the communication path using the perishable transaction token. Each intermediate node validates the perishable transaction token to ensure authenticity and integrity of the transaction and forwards the transaction data to the next node or the edge center. Upon receiving the transaction data, the edge center processes the transaction based on the metadata and security requirements. The edge center sends an acknowledgment of successful transaction completion back to the device through the communication path. The acknowledgment includes a unique identifier associated with the perishable transaction token and a confirmation of compliance with the geofencing restrictions and regulatory requirements specified in the tokenized request. Finally, the edge center and each intermediate node destroy the perishable transaction token to prevent unauthorized reuse.

In some arrangements, the metadata in the tokenized request further includes device-specific parameters comprising battery level, processing capability, and storage capacity, and the quantum cloud orchestration system adjusts the optimal communication path based on these device-specific parameters. In such arrangements, the step of determining an optimal communication path also includes pre-communicating transaction metadata to one or more intermediate nodes along the path, notifying the nodes to prepare for secure and low-latency transaction processing. The perishable transaction token may be encrypted using quantum-safe cryptographic algorithms, including post-quantum cryptography, to enhance security against unauthorized decryption. The entry point token includes a timestamp and expiration time, and the device initiates the transaction only when the entry point token is within its valid time period. The validation of the perishable transaction token at each intermediate node further includes verifying that the geographic location of the device complies with the geofencing restrictions specified in the tokenized request.

In some arrangements, the quantum cloud orchestration system determines a communication path that includes redundancy by selecting multiple paths for the transaction and splitting the transaction data for transmission along these paths to ensure reliability. The quantum cloud orchestration system employs artificial intelligence and machine learning algorithms to predict potential network congestion or node failure and dynamically reroutes the transaction data in real time to avoid disruptions. The acknowledgment sent by the edge center includes a unique identifier associated with the perishable transaction token and confirms compliance with the regulatory requirements specified in the tokenized request. Upon completion of the transaction, the perishable transaction token is destroyed, and the token metadata is logged in a secure ledger maintained by the quantum cloud orchestration system. The ledger provides an immutable audit trail for transaction traceability and compliance verification.

In some arrangements, a system is provided for secure and efficient communication between a device and an edge center using a tokenized framework. The system includes a device configured to generate a tokenized request when experiencing one or more of weak signal strength, high latency, or excessive energy consumption. The tokenized request includes metadata specifying a transaction type, a geolocation determined using ultra-wide band technology, a current network type, destination details, security requirements, device-specific parameters comprising battery level, processing capability, and storage capacity, and geofencing restrictions. A quantum cloud orchestration system is configured to analyze the metadata in the tokenized request to determine an optimal communication path from the device to the edge center, with the path determined based on network availability, latency, device-specific parameters, and the capabilities of intermediate nodes. The quantum cloud orchestration system pre-communicates transaction metadata to one or more intermediate nodes along the communication path to prepare the nodes for secure and low-latency data transmission. It generates an entry point token specifying an initial UWB-enabled node for establishing the communication path and a perishable transaction token encrypted using quantum-safe cryptographic algorithms. The perishable transaction token contains encrypted metadata for authenticating and authorizing the transaction and is time-bound, expiring after a predefined duration or upon transaction completion. The quantum cloud orchestration system transmits the entry point token and the perishable transaction token to the device.

In some arrangements, the system includes intermediate nodes configured to validate the perishable transaction token to ensure the authenticity and integrity of the transaction and verify that the geographic location of the device complies with geofencing restrictions. The intermediate nodes forward the transaction data to subsequent nodes or the edge center. The device establishes a connection to the initial UWB-enabled node using the entry point token, which includes a timestamp and expiration time. The device initiates the transaction by securely transmitting data through the communication path using the perishable transaction token. The quantum cloud orchestration system splits the transaction data into multiple paths for transmission and dynamically reroutes the data to avoid network congestion or node failure, based on predictions made by artificial intelligence and machine learning algorithms.

In some arrangements, the edge center receives the transaction data and processes it based on the metadata and security requirements. The edge center sends an acknowledgment of successful transaction completion back to the device, with the acknowledgment including a unique identifier associated with the perishable transaction token and confirming compliance with geofencing and regulatory requirements. The edge center and each intermediate node destroy the perishable transaction token upon completion of the transaction, and the quantum cloud orchestration system logs the token metadata in a secure ledger that provides an immutable audit trail for traceability and compliance verification. These arrangements include redundancy in the communication path, secure enclaves for token validation at the nodes, and compliance reporting for transactions, ensuring secure, efficient, and scalable communication.

The following description and claims, in conjunction with the drawings—all integral parts of this specification—will clarify various features and characteristics of the current technology. Like reference numerals in the figures correspond to similar parts, enhancing understanding of the technology's methods of operation and the functions of related structural elements, as well as the synergies and economies of their combinations. Some of the processes or procedures described here may be implemented, in whole or in part, as computer-executable instructions recorded on computer-readable media, configured as computer modules, or in other computer constructs. These steps and functionalities may be executed on a single device or distributed across multiple devices interconnected with one another. However, it is important to acknowledge that the drawings primarily serve for descriptive and illustrative purposes and are not intended to delineate the limits of the invention. Unless contextually evident, the singular forms of "a," "an," and "the" used throughout the specification and claims should be interpreted to include their plural counterparts.

BRIEF DESCRIPTION OF DRAWINGS

FIG. 1 is an exemplary system architecture diagram in accordance with one or more embodiments disclosed herein that illustrates a secure and efficient communication framework integrating Ultra-Wide Band technology, quantum cloud orchestration, and tokenized security for device-to-edge transactions. The diagram depicts components and functionalities including token generation, AI-driven path optimization, encrypted communication, multi-path redundancy, and compliance mechanisms, all working cohesively to ensure scalability, reliability, and regulatory adherence.

FIG. 2 is an exemplary flow diagram in accordance with one or more embodiments disclosed herein that illustrates the end-to-end process for secure and efficient communication between a device and an edge center using a tokenized framework. The diagram details the sequential steps of generating tokenized requests, analyzing and optimizing communication paths, validating and securely transmitting transaction data, and completing transactions with acknowledgment and compliance verification.

FIG. 3 is an exemplary sequence diagram in accordance with one or more embodiments disclosed herein that illustrates the step-by-step interactions between the device, quantum cloud orchestration system, intermediate nodes, and edge center for secure and efficient transaction processing. The diagram highlights the generation of tokenized requests, path optimization, token validation, data transmission, acknowledgment, and compliance logging, demonstrating the coordinated functionality of the system components.

FIG. 4 is an exemplary class diagram in accordance with one or more embodiments disclosed herein that illustrates the structural architecture of the invention, detailing the classes, their attributes, methods, and interconnections for secure and efficient communication between a device and an edge center. The diagram highlights the interactions between components such as the device, quantum cloud orchestration system, intermediate nodes, edge center, and supporting modules, emphasizing the functionality of tokenization, path optimization, compliance logging, and energy efficiency.

DETAILED DESCRIPTION

The invention is a sophisticated communication framework that integrates Ultra-Wide Band technology, quantum cloud orchestration, and tokenized security to facilitate secure, efficient, and low-latency communication between devices and edge centers. This system leverages cutting-edge technologies to address critical challenges in modern communication environments, including signal strength issues, latency, energy constraints, and security vulnerabilities. The core design of the invention ensures that transactions are conducted with maximum reliability, scalability, and compliance with regulatory requirements, making it a transformative solution for a wide range of industries and applications.

At the core of the system is the use of Ultra-Wide Band technology, which provides precise geolocation capabilities with centimeter-level accuracy. This precision enables the system to identify nearby UWB-enabled nodes and access points capable of supporting the transaction. The low-energy characteristics of UWB make it ideal for battery-constrained devices such as IoT sensors, wearables, and other mobile technologies, significantly reducing power consumption while maintaining robust connectivity. These attributes ensure that the system can operate effectively in diverse and resource-constrained environments.

Another key component of the invention is its reliance on quantum cloud orchestration. The quantum cloud serves as the central intelligence layer, analyzing transaction metadata to determine the most optimal communication path between the device and the edge center. Using artificial intelligence and machine learning algorithms, the quantum cloud predicts network conditions, identifies potential bottlenecks, and dynamically allocates resources to ensure seamless communication. This orchestration capability enables real-time optimization of transaction paths, reducing latency and improving overall system performance.

The system employs a tokenized security framework to authenticate and authorize transactions. Each transaction is associated with two dynamically generated tokens: an entry point token and a perishable transaction token. The entry point token provides the device with the details of the initial UWB-enabled node for establishing the communication path. The perishable transaction token, encrypted using quantum-safe cryptographic algorithms, contains metadata necessary for authenticating and authorizing the transaction. The time-bound nature of these tokens ensures that they expire after a predefined duration or upon transaction completion, providing an additional layer of security against unauthorized access or reuse.

A unique feature of the invention is its ability to pre-communicate transaction metadata to intermediate nodes along the communication path. This pre-communication ensures that all nodes are prepared for the incoming transaction, reducing processing times and enabling low-latency data transfer. The intermediate nodes validate the tokens at each step to maintain the integrity and security of the transaction. This validation process ensures that only authorized transactions are processed and that sensitive data remains protected throughout its journey.

The invention's ability to handle multi-path redundancy is another critical aspect. The system can split transaction data into multiple paths for transmission, providing redundancy to guarantee delivery even in cases of network congestion or node failure. The quantum cloud dynamically reroutes transaction data in real time, based on its AI-driven predictions of network conditions. This redundancy mechanism enhances the reliability and robustness of the system, particularly in high-density or critical application environments.

Compliance with regulatory standards such as GDPR and PCI DSS is embedded in the system's design. The tokenized framework ensures that data is encrypted and stored only for the duration of the transaction, meeting stringent data protection and privacy requirements. Additionally, the system incorporates geofencing rules into the tokenized metadata, allowing transactions to be restricted to specific geographic regions. These features make the invention highly suitable for applications in regulated industries such as finance, healthcare, and logistics.

The system includes mechanisms for logging transaction metadata in a secure ledger maintained by the quantum cloud. This ledger provides an immutable audit trail, enabling traceability and accountability for all transactions. The use of distributed ledger technology further enhances the transparency and security of the system, ensuring that all transaction activities are auditable and tamper-proof. This capability is particularly valuable in industries requiring rigorous compliance and reporting.

Energy efficiency is a core consideration of the invention, particularly for IoT devices and wearables. By offloading computationally intensive tasks such as token generation and path optimization to the quantum cloud, the system minimizes the energy consumption of individual devices. This design feature extends the operational lifespan of connected devices and supports their deployment in resource-constrained or remote environments where frequent recharging is not feasible.

The invention is designed for scalability, accommodating the growing volume of connected devices and data traffic in modern communication ecosystems. Its modular architecture allows it to integrate seamlessly with existing infrastructure and adapt to future technological advancements. This scalability ensures that the system can support large-scale deployments in diverse environments, from smart cities and industrial automation to global supply chains and emergency response systems.

The invention's hybrid network integration is another standout feature, combining the precision of UWB with the reach of traditional networks such as 5G and Wi-Fi. This integration ensures seamless transitions between different network types, enabling uninterrupted communication even in complex or heterogeneous network environments. The system's ability to maintain consistent performance across diverse conditions makes it a versatile solution for a wide range of applications.

One of the unique aspects of the invention is its focus on user-specific customization. The tokenized framework allows for the inclusion of device-specific parameters such as battery level, processing capability, and storage capacity. These parameters are used by the quantum cloud to tailor the communication path and optimize resource allocation based on the unique requirements of each device. This customization capability enhances the adaptability and effectiveness of the system.

The invention also supports dynamic role-based access control, allowing transactions to be restricted based on user roles, device types, or temporal conditions. This feature provides fine-grained control over transaction permissions, ensuring that only authorized users or devices can initiate or process transactions. Such control mechanisms enhance security and reduce the risk of unauthorized access.

Applications of the invention span multiple domains, including secure access control in smart workplaces, contactless retail shopping, dynamic ticketing for public transport, personalized hospitality experiences, and emergency response coordination. The system's ability to securely and efficiently manage transactions in real time makes it a valuable tool for enhancing operational efficiency and user experience across various industries.

Overall, the invention represents a transformative approach to communication challenges, combining advanced technologies to deliver secure, efficient, and scalable solutions. Its focus on energy efficiency, tokenized security, real-time orchestration, and regulatory compliance sets it apart from existing systems, making it a pioneering innovation in the field of device-to-edge communication. By addressing critical pain points and providing a robust, future-proof framework, the invention establishes a new standard for secure and efficient communication.

The description of various example embodiments herein is intended to achieve the goals previously outlined, referencing the illustrations included in this disclosure. These illustrations depict multiple systems and methods for implementing the disclosed information. It should be recognized that alternative implementations are possible, and modifications to both structure and functionality may be made. The description details various connections between elements, which should be interpreted broadly. Unless explicitly stated otherwise, these connections can be either direct or indirect and may be established through either wired or wireless methods. This document does not aim to restrict the nature of these connections.

In various configurations, terms such as "computers" and "machines" refer to devices that may be general-purpose or specialized for specific tasks, whether physical or virtual, and capable of network connectivity. These devices encompass all necessary hardware, software, and components known to skilled practitioners, including application-specific integrated circuits (ASICs), microprocessors, cores, or other processing units. These components execute, control, or implement various types of software, instructions, data, modules, processes, or routines. The terms used do not restrict the device type and should be broadly interpreted. Software, data, and executable code can reside on various physical, computer-readable storage devices, such as local memory, cloud-based storage, or network-attached storage. These can be stored in both volatile and non-volatile memory and may function autonomously or respond to specific triggers. These elements can be consolidated or distributed across multiple devices and stored in accessible memory systems such as distributed databases, big data infrastructures, blockchains, or distributed ledgers.

Networks and similar references refer to a broad range of communication systems, from local area networks (LANs) and wide area networks (WANs) to the Internet and cloud-based networks, supporting wired and wireless configurations. Specialized networks like digital subscriber line (DSL), frame relay, asynchronous transfer mode (ATM), and virtual private networks (VPN) are included. These networks utilize various hardware and software components, including modems, routers, firewalls, switches, and adapters, to facilitate communication. Networks are also equipped with virtual IP addresses and support multiple protocols like HTTPS, enabling effective packet-based data transmission and communication.

Generative Artificial Intelligence (AI) refers to AI techniques that learn from training data and generate new content, such as text, code, images, and audio. Generative AI systems, often powered by large language models (LLMs) like GPT-3, GPT-4, Meta LLaMA, and others, can be deployed through APIs, search engines, or chatbots. These models, which may be proprietary or open source, leverage deep learning methods and are generally governed by enterprise policies regarding AI and risk. Models such as BERT, T5, AlphaFold, Watson, Megatron, and others play a role in generating or interpreting language and content for various applications.

Generative AI and LLMs are utilized throughout this disclosure for tasks including natural language processing, data analysis, real-time processing, software development, and creative content generation. Specific functions include trend analysis, data classification, sentiment analysis, writing assistance, language translation, and decision-making support. These models enable capabilities like feedback learning, context determination, and comprehensive search operations, improving performance through iterative learning and feedback from human or system interactions. The wide range of applications supported by generative AI makes these systems a powerful tool in generating, analyzing, and managing information across diverse fields. All configurations and uses of these models are within the scope of this disclosure.

FIG. 1 provides a detailed depiction of a system architecture designed to facilitate secure, efficient, and scalable communication between a device and an edge center using a tokenized framework. The central component of this system is the device, identified as element (100), which initiates the communication process by generating a tokenized request when it encounters conditions such as weak signal strength, high latency, or excessive energy consumption. The device includes a UWB transceiver, element (102), which is critical for precise geolocation, allowing the system to determine the device's location with centimeter-level accuracy. This capability enables efficient identification of nearby UWB-enabled nodes and ensures reliable connectivity in challenging environments. Additionally, the device houses a token generator, element (104), responsible for creating the tokenized request. The tokens include metadata such as transaction type, geolocation, current network type, destination details, security requirements, device-specific parameters such as battery level, processing capability, and storage capacity, and geofencing restrictions. This metadata is encrypted using quantum-safe cryptographic algorithms to ensure robust security and prevent unauthorized access.

The tokenized request generated by the device is sent to the quantum cloud orchestration system, element (106), which serves as the core processing hub for managing and optimizing the transaction. The orchestration system analyzes the metadata in the tokenized request to determine the optimal communication path between the device and the edge center. Within the quantum cloud orchestration system, the AI/ML prediction module, element (108), plays a vital role by employing artificial intelligence and machine learning algorithms to predict network conditions, identify potential congestion or node failures, and make real-time adjustments to the communication path. This prediction capability ensures that the system dynamically responds to changes in network conditions, optimizing performance and minimizing delays.

The quantum cloud orchestration system also includes a path optimization module, element (110), which calculates the most efficient route for the transaction. This module considers factors such as network availability, latency, device-specific parameters, and intermediate node capabilities. Additionally, the path optimization module incorporates redundancy by selecting multiple communication paths for the transaction. This redundancy mechanism provides failover capabilities, ensuring that transaction data reaches its destination even in the event of network congestion or node failure. Complementing these features is the pre-communication module, element (112), which preemptively sends transaction metadata to intermediate nodes along the communication path. This ensures that the nodes are prepared for the transaction, reducing latency and enabling seamless processing.

The quantum cloud orchestration system generates two key tokens for the transaction: the entry point token, element (114), and the perishable transaction token, element (116). The entry point token specifies the initial UWB-enabled node where the device will establish its connection. This token includes a timestamp and expiration time to ensure it is used within its valid period. The perishable transaction token contains encrypted metadata for authenticating and authorizing the transaction. The time-bound nature of this token ensures it expires after a predefined duration or once the transaction is completed, providing enhanced security against reuse or tampering.

The system also includes intermediate nodes, element (118), strategically placed along the communication path. These nodes validate the perishable transaction token at each stage to maintain the integrity and authenticity of the transaction. Validation involves checking compliance with geofencing restrictions and verifying the token's metadata to ensure it aligns with the parameters specified in the tokenized request. Once validated, the intermediate nodes forward the transaction data to subsequent nodes or the edge center, enabling secure and efficient transmission.

The edge center, element (120), is the final destination for the transaction data. Upon receiving the data, the edge center processes the transaction based on the metadata and security requirements outlined in the tokenized request. The edge center is equipped with an acknowledgment module, element (122), which generates a confirmation message upon successful transaction completion. This acknowledgment includes a unique identifier associated with the perishable transaction token and a statement of compliance with regulatory and geofencing requirements. The acknowledgment is transmitted back to the device through the same communication path, completing the transaction lifecycle.

To ensure the highest levels of security, the system incorporates a token destruction module, element (124), in both the edge center and the intermediate nodes. This module ensures that the perishable transaction token is destroyed immediately upon transaction completion, preventing any unauthorized reuse. The token metadata is logged in the quantum cloud ledger, element (126), which serves as a secure and immutable storage system for transaction records. The quantum cloud ledger utilizes distributed ledger technology to enhance transparency and traceability, providing a comprehensive audit trail for regulatory compliance and operational analysis.

The system architecture also includes several additional modules designed to enhance functionality and performance. The secure network interface, element (128), facilitates encrypted communication between the device, intermediate nodes, and the edge center, ensuring the confidentiality and integrity of all data transmitted. The energy optimization module, element (130), within the device adjusts power consumption based on recommendations from the quantum cloud orchestration system, optimizing the energy efficiency of the transaction. The compliance reporting module, element (132), located in the edge center, generates detailed reports summarizing adherence to geofencing and regulatory requirements. These reports provide valuable insights for audits and compliance verification.

The redundancy management module, element (134), in the quantum cloud orchestration system manages the splitting of transaction data across multiple paths. This module dynamically reroutes data in real time to avoid disruptions caused by network congestion or node failure, ensuring reliable and uninterrupted communication. The distributed token storage, element (136), in the quantum cloud ledger, leverages distributed ledger technology to decentralize and secure the storage of token metadata. This feature further enhances the resilience and reliability of the system's data management capabilities.

The architecture includes a UWB node locator, element (138), within the quantum cloud orchestration system, which identifies the most appropriate UWB-enabled nodes or access points near the device. By analyzing the metadata in the tokenized request, the UWB node locator ensures that the transaction path is optimized for efficiency and reliability.

Thus, FIG. 1 illustrates a comprehensive, scalable, and secure system architecture that integrates all unique features and functionalities of the invention. The described components work cohesively to address challenges in device-to-edge communication, providing robust solutions for security, efficiency, energy optimization, redundancy, and compliance. Each element of the system is meticulously designed to ensure seamless interaction and optimal performance, making this architecture a transformative advancement in modern communication systems.

FIG. 2 illustrates an exemplary flow diagram that represents the end-to-end process of the invention for facilitating secure and efficient communication between a device and an edge center using a tokenized framework. The flow diagram begins with the device encountering specific conditions such as weak signal strength, high latency, or excessive energy consumption, prompting it to generate a tokenized request. This request includes metadata specifying the transaction type, geolocation determined via ultra-wide band (UWB) technology, current network type, destination details, security requirements, device-specific parameters such as battery level and processing capability, and geofencing restrictions (200).

The tokenized request is then transmitted to the quantum cloud orchestration system for further analysis and processing (202). The quantum cloud orchestration system analyzes the metadata to determine the optimal communication path between the device and the edge center. This determination considers factors such as network availability, latency, device-specific parameters, and the capabilities of intermediate nodes (204). The system employs artificial intelligence and machine learning algorithms within the AI/ML prediction module to predict potential network congestion, node failures, or latency issues, ensuring the communication path is dynamically optimized for current conditions (206).

Based on these predictions, the quantum cloud orchestration system dynamically adjusts the communication path to account for real-time changes in the network environment. This step ensures uninterrupted and efficient data transmission, even in scenarios with fluctuating network performance (208). To prepare for the transaction, the system pre-communicates metadata to the intermediate nodes along the selected path. This pre-communication allows the nodes to optimize their resources for low-latency processing and secure transmission (210).

The quantum cloud orchestration system generates two essential tokens for the transaction. The first is the entry point token, which identifies the initial UWB-enabled node for establishing the communication path. This token includes a timestamp indicating its validity period and an expiration time to prevent misuse (212). The second is the perishable transaction token, which contains encrypted metadata for authentication and authorization. This token is time-bound, expiring after a predefined duration or upon transaction completion, ensuring robust security (214). Both tokens are transmitted back to the device, equipping it with the necessary credentials to initiate and execute the transaction (216).

The device establishes a connection with the identified UWB-enabled node using the entry point token. Before proceeding, the device ensures that the token is valid based on its timestamp and expiration time (218). The transaction is initiated when the device transmits data securely through the communication path using the perishable transaction token (220). At each intermediate node along the path, the perishable transaction token is validated to ensure the transaction's authenticity and integrity. The nodes also verify compliance with geofencing restrictions before forwarding the data to the next node or the edge center (222).

If network conditions change during the transaction, the system dynamically reroutes the data in real time to avoid congestion or node failures. This functionality is managed by the AI/ML algorithms in the quantum cloud orchestration system, ensuring that the transaction continues seamlessly without interruption (224). Once the transaction data reaches the edge center, it is processed based on the metadata and security requirements specified in the tokenized request. The results of the processing are logged for traceability (226).

Upon successful completion of the transaction, the edge center generates an acknowledgment message that includes a unique identifier for the perishable transaction token and a confirmation of compliance with geofencing and regulatory requirements. This acknowledgment is transmitted back to the device through the communication path (228). To maintain security, the perishable transaction token is destroyed at both the edge center and the intermediate nodes upon transaction completion, preventing any unauthorized reuse (232). Additionally, the token metadata is logged in the quantum cloud ledger, providing an immutable audit trail that supports compliance verification and traceability (234).

During the transaction, the device's energy optimization module adjusts its power consumption based on recommendations from the quantum cloud orchestration system. This ensures energy efficiency, particularly for battery-constrained devices such as IoT sensors and wearables (236). The process concludes when the transaction is successfully completed, the acknowledgment is delivered, and all metadata is securely logged (238).

Thus, FIG. 2 comprehensively illustrates the detailed sequence of operations in the invention, capturing all flow steps, key functionalities, and core elements from the method and system claims. It integrates advanced features such as UWB geolocation, quantum-safe tokenization, AI-driven optimization, multi-path redundancy, secure data transmission, and regulatory compliance. Each step ensures the robustness, scalability, and security of the framework, addressing critical challenges in modern communication systems.

FIG. 3 illustrates an exemplary sequence diagram showcasing the detailed interactions between the key actors of the system: the Device Actor, the Quantum Cloud Orchestration System Actor, the Intermediate Node Actor, and the Edge Center Actor. This sequence diagram captures the core processes, key functionalities, and unique elements of the invention, demonstrating the complete flow of secure and efficient communication from transaction initiation to completion. Each interaction is represented sequentially, following the numbering provided in the instructions.

The sequence begins with the Device Actor generating a tokenized request when it encounters conditions such as weak signal strength, high latency, or excessive energy consumption. This tokenized request includes essential metadata such as transaction type, geolocation determined using ultra-wide band (UWB) technology, current network type, destination details, security requirements, device-specific parameters (e.g., battery level and processing capacity), and geofencing restrictions. This metadata is encrypted using quantum-safe cryptographic algorithms to ensure security (300). The Device Actor then sends the tokenized request to the Quantum Cloud Orchestration System Actor for analysis and processing (302).

Upon receiving the tokenized request, the Quantum Cloud Orchestration System Actor analyzes the metadata to determine the optimal communication path from the Device Actor to the Edge Center Actor. The analysis considers network availability, latency, device-specific parameters, and the capabilities of the Intermediate Node Actor(s) along the potential paths (304). Using its AI/ML Prediction Module, the Quantum Cloud Orchestration System Actor predicts potential issues such as network congestion, node failures, and latency disruptions. These predictions enable proactive adjustments to the communication path, ensuring efficient data transfer (306).

Based on the predictions, the Quantum Cloud Orchestration System Actor dynamically adjusts the communication path in real-time, selecting the most efficient and reliable route while accounting for network conditions. This step ensures the system's adaptability to changing environments (308). The Quantum Cloud Orchestration System Actor then pre-communicates transaction metadata to the Intermediate Node Actor(s) along the selected path, preparing them for low-latency processing and secure transmission of transaction data (310).

The Quantum Cloud Orchestration System Actor generates two critical tokens to facilitate the transaction. The first token is the entry point token, which specifies the initial UWB-enabled node for establishing the communication path. This token includes a timestamp and expiration time, ensuring it is used within a predefined validity period (312). The second token is the perishable transaction token, which contains encrypted metadata for authenticating and authorizing the transaction. The perishable token is time-bound, expiring after a specific duration or upon transaction completion, preventing unauthorized reuse (314). Both tokens are transmitted to the Device Actor, enabling it to proceed with the transaction (316).

Using the entry point token, the Device Actor establishes a connection to the identified UWB-enabled node. Before proceeding, the Device Actor verifies the validity of the token based on its timestamp and expiration time (318). Once the connection is established, the Device Actor initiates the transaction by securely transmitting data through the communication path using the perishable transaction token (320). As the transaction data traverses the communication path, the Intermediate Node Actor validates the perishable transaction token at each step. This validation ensures the authenticity and integrity of the transaction and confirms compliance with geofencing restrictions. After validation, the Intermediate Node Actor forwards the data to the next node or the Edge Center Actor (322).

If network conditions change during the transaction, the Quantum Cloud Orchestration System Actor dynamically reroutes transaction data in real-time. This rerouting is managed by its AI/ML algorithms to avoid disruptions caused by congestion or node failures, ensuring uninterrupted communication (324). The Edge Center Actor receives the transaction data and processes it based on the metadata and security requirements specified in the tokenized request. The processing results are logged for traceability and further analysis (326).

Following the successful processing of the transaction, the Edge Center Actor generates an acknowledgment that includes a unique identifier associated with the perishable transaction token and a confirmation of compliance with geofencing and regulatory requirements. This acknowledgment is sent back to the Device Actor through the same communication path (328). To maintain security, the Edge Center Actor and Intermediate Node Actor destroy the perishable transaction token upon transaction completion. This step prevents unauthorized reuse and ensures the confidentiality of the transaction (332).

The Quantum Cloud Orchestration System Actor logs the token metadata in a secure ledger, providing an immutable audit trail for compliance verification and traceability. This ledger is maintained using distributed ledger technology, further enhancing the system's transparency and reliability (334). During the transaction, the Device Actor's energy optimization module adjusts its power consumption based on recommendations from the Quantum Cloud Orchestration System Actor, ensuring energy efficiency throughout the process (336). The sequence concludes once the acknowledgment is delivered to the Device Actor, and all metadata is securely logged (338).

Thus, FIG. 3 provides a comprehensive view of the interactions between the system's actors, integrating core functionalities such as UWB geolocation, quantum-safe tokenization, AI-driven path optimization, dynamic rerouting, and compliance mechanisms. It highlights the seamless coordination between components and modules to achieve secure, efficient, and scalable communication while addressing critical challenges in modern communication systems.

FIG. 4 represents a highly detailed class diagram that provides a structural overview of the invention, capturing the relationships, attributes, and methods of all the key components involved in the secure and efficient communication framework. Each class is designed to perform a specific function, and together they form an interconnected system that ensures the seamless flow of data from the originating device to the edge center.

At the center of the architecture is the Device Class (400), which serves as the initiator of the communication process. The Device Class includes attributes such as deviceID, which uniquely identifies the device; location, which stores the device's precise geolocation determined using ultra-wide band (UWB) technology; and networkType, which indicates the type of network currently in use. Other attributes include batteryLevel, processingCapacity, and storageCapacity, which provide critical device-specific parameters for energy management and transaction optimization. The geofencingRestrictions attribute ensures that the device operates within predefined geographic boundaries, while the tokenizedRequest attribute stores the metadata necessary for initiating transactions. The Device Class provides methods such as generateTokenizedRequest, which creates the initial request containing metadata like transaction type, destination, and security requirements. This class also includes methods like sendRequestToCloud, which transmits the tokenized request to the Quantum Cloud Orchestration System Class (404), establishConnection, which connects to the identified UWB-enabled node, transmitData, which securely sends transaction data, and adjustPowerConsumption, which optimizes power usage based on feedback from the Quantum Cloud Orchestration System.

The UWB Transceiver Class (402) is closely associated with the Device Class and provides geolocation services. Its attributes include precision and range, which define the accuracy and coverage of the UWB technology. The determineLocation method calculates the device's location with centimeter-level precision, while the connectToNode method establishes a direct connection to the nearest UWB-enabled node, facilitating efficient communication.

The Quantum Cloud Orchestration System Class (404) acts as the central processing unit of the framework, orchestrating the flow of transactions and ensuring that all system components function cohesively. It includes attributes such as optimalPath, which represents the dynamically determined route for data transmission; currentNetworkConditions, which provides real-time insights into network performance; and complianceLog, which tracks adherence to regulatory requirements. The methods in this class include analyzeRequestMetadata, which evaluates the tokenized request; predictNetworkIssues, which leverages AI/ML algorithms to forecast potential network congestion or failures; and adjustPathBasedOnPredictions, which dynamically modifies the communication path to ensure optimal performance. This class also generates the tokens needed for authentication and data transmission through methods like generateEntryPointToken and generatePerishableToken. Additionally, preCommunicateMetadata prepares the intermediate nodes for processing incoming transactions, while sendTokensToDevice transmits the generated tokens back to the Device Class. The Quantum Cloud Orchestration System also maintains a robust compliance and traceability framework through its logTransaction method.

The Intermediate Node Class (406) represents the nodes along the communication path that process and forward transaction data. This class includes attributes like nodeID, capacity, and secureEnclave, which ensure the node's ability to handle data securely and efficiently. Its methods include validateToken, which confirms the authenticity of incoming tokens; forwardTransactionData, which enables seamless data transfer to subsequent nodes or the edge center; and destroyToken, which securely deletes tokens after the transaction is completed.

The Edge Center Class (408) is the endpoint for transaction processing and acknowledgment generation. Its attributes include edgeCenterID, which uniquely identifies the edge center; complianceDetails, which store regulatory adherence information; and acknowledgmentLog, which tracks acknowledgments sent to devices. Methods such as processTransaction handle the data received from the intermediate nodes, while generateAcknowledgment creates a confirmation of successful transaction completion. The sendAcknowledgmentToDevice method transmits this confirmation to the Device Class, and destroyToken ensures secure token disposal after transaction processing.

The AI/ML Module Class (410) supports the Quantum Cloud Orchestration System by providing predictive analytics. Its attributes include predictionModel and trainingData, which form the basis for its AI/ML algorithms. The methods predictNetworkConditions and suggestPathAdjustments optimize communication paths by forecasting network behavior and recommending changes in real time.

The Token Class (412) encapsulates the structure and functionality of the tokens used throughout the system. Attributes such as tokenID, type, metadata, and expirationTime define each token's properties, while methods like encryptToken securely encode metadata, and validateTokenDetails ensure that tokens are authentic and valid.

The Quantum Cloud Ledger Class (414) maintains a secure, immutable record of transaction metadata for compliance and traceability. Attributes such as transactionLog and auditTrail provide a historical record of all transactions, while methods like logTransactionDetails and generateComplianceReport ensure that all operations adhere to regulatory standards.

The Energy Optimization Module Class (416) interfaces with the Device Class to enhance energy efficiency. Its attributes include optimizationParameters, which guide its functionality, while its suggestPowerAdjustments method provides device-specific recommendations for minimizing energy consumption during transactions.

The relationships between these classes highlight their interdependence. The Device Class interacts with the UWB Transceiver Class for geolocation and connection services and communicates with the Quantum Cloud Orchestration System Class for transaction coordination. The Quantum Cloud Orchestration System interacts with the AI/ML Module for predictive insights and the Intermediate Node Class for metadata pre-communication and validation. The Edge Center Class collaborates with the Quantum Cloud Ledger for compliance tracking and acknowledgment generation, while the Energy Optimization Module provides power-saving measures to the Device Class. The Token Class is utilized by multiple classes for secure token creation, validation, and disposal.

Thus, FIG. 4 provides an expansive view of the invention's architecture, detailing the attributes, methods, and interconnections that enable a secure, scalable, and efficient communication framework. This class diagram emphasizes the intricate design and functionality of each component, showcasing their roles in achieving the invention's goals.

Pseudocode exemplars for implementing various aspects of this disclosure are set forth below with explanations for reference.

#Step 1: Device Generates a Token

```
def generate_token(device_id, transaction_type, location,
network_type, destination, security_requirements):
    token_metadata = {
        "device_id": device_id,
        "transaction_type": transaction_type,
        "location": location,
        "network_type": network_type,
```

-continued

```
        "destination": destination,
        "security_requirements": security_requirements
    }
    token = encrypt_token(token_metadata)
    return token
```

#Step 2: Send the Device Tokens to the Quantum Cloud

```
def send_to_quantum_cloud(token):
    quantum_cloud = connect_to_quantum service( )
    response = quantum_cloud.process_token(token)
    return response
```

#Step 3: Orchestration and Creation of Perishable Tokens

```
def orchestrate_transaction(cloud_response):
    network_path = cloud_response.get("optimal_path")
    entry_point_token = create_entry_point_token(network_path)
    perishable_token = create_perishable_token(cloud_response)
    return entry_point_token, perishable_token
```

#Step 4: Assign Tokens to the Device

```
def assign_tokens_to_device(device_id, entry_point_token,
perishable_token):
    device = find_device_by_id(device_id)
    device.receive_tokens(entry_point_token, perishable_token)
```

#Step 5: Execute the Transaction

```
def execute_transaction(device, transaction_data):
    entry_point = device.get_entry_point( )
    network = connect_to_entry_point(entry_point)
    for node in network.path:
        validate_token(node, transaction_data["perishable_token"])
        forward_transaction(node, transaction_data)
```

#Step 6: Acknowledge Completion and Destroy Tokens

```
def complete_transaction(device, network, acknowledgment_data):
    send_acknowledgment_to_device(device, acknowledgment_data)
    destroy_tokens(network)
```

#Utility Functions

```
def encrypt_token(metadata):
    return quantum_encrypt(metadata)
def create_entry_point_token(path):
        return {"entry_point": path[0], "timestamp": current_time( ),
"expires_in": 300}
def create_perishable_token(data):
        return {"transaction_id": data["transaction_id"], "auth_data":
quantum_encrypt(data), "expires_in": 600}
def validate_token(node, token):
    if not node.validate(quantum_decrypt(token)):
        raise SecurityError("Invalid token at node:", node)
def destroy_tokens(network):
    for node in network.path:
        node.invalidate_tokens( )
```

As illustrated above, the pseudocode begins by defining a function for the device to generate a token. The 'generate_token' function encapsulates metadata such as the device ID, transaction type, geolocation, network type, destination, and security requirements. This metadata is encrypted to ensure security and returned as the token. This initial step is crucial for creating a secure and unique identifier for the transaction.

The next function, 'send_to_quantum_cloud', facilitates communication with the quantum cloud orchestration service. This service processes the token, evaluates network conditions, and provides the optimal path for the transaction. It serves as the central intelligence layer, leveraging AI and machine learning to predict network behavior and allocate resources dynamically.

Once the quantum cloud has processed the token, the orchestration function creates two additional tokens: the entry point token and the perishable transaction token. The entry point token identifies the initial network node, while the perishable token ensures end-to-end security and authentication. These tokens are dynamically generated with encryption and time-bound validity to enhance security.

The 'assign_tokens_to_device' function transmits the generated tokens back to the originating device. This ensures that the device is equipped with the necessary credentials to initiate and complete the transaction securely. The tokens act as the foundation for all subsequent communication.

Transaction execution is handled by the 'execute_transaction' function, which uses the entry point token to establish a connection to the UWB network. Each node in the network path validates the perishable token to authenticate the transaction and ensure compliance with security protocols. The transaction data is then forwarded node by node to the destination.

Finally, the 'complete_transaction' function handles the acknowledgment and cleanup processes. Upon successful completion of the transaction, an acknowledgment is sent to the device. Tokens are then destroyed at each node to prevent unauthorized reuse and maintain the integrity of the system. Utility functions such as 'encrypt_token', 'validate_token', and 'destroy_tokens' provide foundational support for security, validation, and lifecycle management of the tokens.

This pseudocode encapsulates the entire workflow of the UWB-based quantum tokenized communication framework, incorporating all key, core, and unique features such as quantum encryption, dynamic orchestration, hybrid network integration, and perishable token security. The modular structure ensures scalability, adaptability, and ease of implementation across various applications.

A skilled artisan, upon reviewing the disclosure, will appreciate that there are numerous alternatives, modifications, combinations, and customizations that can be made to the systems and methods described herein.

The systems and methods described in the disclosure can be adapted, modified, and combined in various ways to meet diverse operational needs, accommodate technological advancements, and address application-specific requirements. These alternatives, modifications, combinations, and customizations remain consistent with the spirit and scope of the invention.

The framework could use alternative communication protocols such as Li-Fi, Narrowband IoT, or satellite-based systems to ensure broader applicability in scenarios where UWB infrastructure is unavailable. The token structure can be enhanced to include additional metadata, such as device diagnostics or environmental conditions, and incorporate multi-factor authentication elements like biometric data to strengthen security. Token lifespans can be adjusted based on the transaction's criticality, with shorter durations for financial transactions and longer ones for logistics operations. Integration with decentralized ledger technologies, including blockchain or Holochain, would enhance traceability and immutability, particularly for compliance and audit purposes.

The system could adopt a hybrid orchestration model that combines classical cloud computing with quantum orchestration, allowing a phased integration of quantum technology. Multi-network integration could expand to include private LTE, mmWave, or legacy systems like 3G, enabling enhanced redundancy and failover capabilities. Artificial intelligence and machine learning algorithms used for network condition prediction and path optimization could be tailored to prioritize data types or application domains, such as prioritizing financial data in banking. Modifications to the physical layer, such as antenna designs with adaptive beamforming or multi-antenna configurations, could further optimize UWB performance.

The framework could integrate with IoT ecosystems, providing APIs or SDKs for seamless operation within smart cities, industrial IoT, or consumer IoT environments. Energy efficiency could be improved further by integrating energy harvesting technologies, such as solar panels or kinetic energy systems, to power IoT devices. Role-based access control could be dynamically customized based on user roles or device types, allowing granular transaction permissions. The pre-communication mechanism could include device-specific parameters, such as storage capacity or latency thresholds, to improve orchestration precision.

Support for air-gapped systems could be introduced to enable secure data exchange in environments with restricted network connectivity. Tokens could incorporate geofencing rules to limit their validity to specific geographic areas or integrate contextual data like traffic or weather conditions to optimize transaction paths. Multi-path redundancy could ensure reliability by enabling transactions to traverse multiple routes simultaneously, mitigating the risk of node failures or network congestion. Decentralized quantum orchestration nodes could be deployed at strategic points to handle localized orchestration, reducing dependency on central quantum clouds.

End-users could customize orchestration preferences, token generation, and network settings through a user interface, improving adaptability to specific requirements. Real-time streaming applications, such as video conferencing or live telemetry, could benefit from adaptive bitrate management or low-latency buffering features. An emergency-only mode could prioritize critical communications, such as alerts or disaster response data, by dynamically allocating network resources to high-priority channels. Integration with existing security frameworks, including enterprise identity management or multi-layer firewalls, could extend the system's compatibility within organizational infrastructures.

The framework could enable secure token sharing between trusted devices, allowing collaborative workflows or multi-device transactions. Quantum-safe cryptographic algorithms could replace current encryption mechanisms to maintain security in post-quantum environments. These modifications, alternatives, and combinations enhance the framework's adaptability, ensuring its relevance across diverse applications and technological landscapes while adhering to the core principles of secure, efficient, and scalable communication.

Although the present technology has been described based on what is currently considered the most practical and preferred implementations, it is to be understood that this detail is only for that purpose and this disclosure is not limited to the sample descriptions and implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A method for facilitating secure and efficient communication between a device and an edge center using a tokenized framework, the method comprising:

receiving, at a quantum cloud orchestration system, a tokenized request generated by a device, wherein the device is experiencing one or more of weak signal strength, high latency, or excessive energy consumption, and wherein the tokenized request includes metadata specifying a transaction type, a geolocation determined using ultra-wide band (UWB) technology, a current network type, destination details, and security requirements;

analyzing, by the quantum cloud orchestration system, the metadata within the tokenized request to determine an optimal communication path from the device to the edge center, wherein the communication path is determined based on network availability, latency, and capabilities of intermediate nodes;

identifying, by the quantum cloud orchestration system, one or more UWB-enabled nodes or access points near the device that are capable of facilitating the transaction;

generating, by the quantum cloud orchestration system, an entry point token specifying an initial UWB-enabled node for establishing a communication path and a perishable transaction token, wherein the perishable transaction token contains encrypted metadata for authenticating and authorizing the transaction, and wherein the perishable transaction token is time-bound and expires after a predefined duration or upon completion of the transaction;

transmitting, by the quantum cloud orchestration system, the entry point token and the perishable transaction token to the device for use in initiating and conducting the transaction;

establishing, by the device, a connection to an identified initial UWB-enabled node using the entry point token and initiating the transaction by transmitting transaction data securely through the communication path using the perishable transaction token;

validating, by each intermediate node along the communication path, the perishable transaction token to ensure the authenticity and integrity of the transaction before forwarding the transaction data to a subsequent node or the edge center;

receiving, by the edge center, the transaction data and processing the transaction based on the metadata and security requirements specified in the tokenized request;

sending, by the edge center, an acknowledgment of successful transaction completion back to the device through the communication path; and destroying, by the edge center and each intermediate node, the perishable transaction token upon completion of the transaction to prevent unauthorized reuse and maintain security.

2. The method of claim 1, wherein the metadata in the tokenized request further includes device-specific parameters comprising battery level, processing capability, and storage capacity, and wherein the quantum cloud orchestration system adjusts the optimal communication path based on these device-specific parameters.

3. The method of claim 2, wherein the step of determining an optimal communication path further includes pre-communicating transaction metadata to the one or more intermediate nodes along the communication path, the pre-communication notifying the nodes to prepare for low-latency processing and secure data transmission.

4. The method of claim 3, wherein the perishable transaction token is encrypted using quantum-safe cryptographic algorithms, including post-quantum cryptography, to enhance security and prevent unauthorized decryption by adversarial quantum computing systems.

5. The method of claim 4, wherein the entry point token includes a timestamp indicating when the token becomes valid and an expiration time, and wherein the device initiates the transaction only when the entry point token is within its valid time period.

6. The method of claim 5, wherein the step of validating the perishable transaction token at each intermediate node further includes verifying geographic location of the device and ensuring the geographic location complies with geofencing restrictions specified in the tokenized request.

7. The method of claim 6, wherein the communication path determined by the quantum cloud orchestration system includes redundancy by selecting multiple paths for the transaction, and wherein the transaction data is split and transmitted along the multiple paths for added security and reliability.

8. The method of claim 7, wherein the quantum cloud orchestration system employs artificial intelligence and machine learning algorithms to predict potential network congestion or node failure along the communication path and dynamically reroutes the transaction data in real time to avoid disruptions.

9. The method of claim 8, wherein the transaction acknowledgment sent by the edge center includes a unique identifier associated with the perishable transaction token and a confirmation of compliance with regulatory requirements specified in the tokenized request.

10. The method of claim 9, wherein the step of destroying the perishable transaction token further includes logging token metadata in a secure ledger maintained by the quantum cloud orchestration system, the ledger providing an immutable audit trail for transaction traceability and compliance verification.

11. A method for secure and efficient communication between a device and an edge center using a tokenized framework, the method comprising:

receiving, at a quantum cloud orchestration system, a tokenized request generated by a device, wherein the device is experiencing one or more of weak signal strength, high latency, or excessive energy consumption, and wherein the tokenized request includes metadata specifying a transaction type, a geolocation determined using ultra-wide band (UWB) technology, a current network type, destination details, security requirements, device-specific parameters comprising battery level, processing capability, and storage capacity, and geofencing restrictions;

analyzing, by the quantum cloud orchestration system, the metadata within the tokenized request to determine an optimal communication path from the device to the edge center, wherein the communication path is determined based on network availability, latency, device-specific parameters, and the capabilities of intermediate nodes;

pre-communicating, by the quantum cloud orchestration system, transaction metadata to one or more intermediate nodes along the communication path, the pre-communication notifying the nodes to prepare for low-latency processing and secure data transmission;

generating, by the quantum cloud orchestration system, an entry point token specifying an initial UWB-enabled node for establishing a communication path and a perishable transaction token encrypted using quantum-safe cryptographic algorithms, wherein the perishable transaction token contains encrypted metadata for authenticating and authorizing the transaction, and wherein the perishable transaction token is time-bound and expires after a predefined duration or upon completion of the transaction;

transmitting, by the quantum cloud orchestration system, the entry point token and the perishable transaction token to the device for use in initiating and conducting the transaction;

establishing, by the device, a connection to an identified initial UWB-enabled node using the entry point token, wherein the entry point token includes a timestamp indicating when the token becomes valid and an expiration time, and initiating the transaction by transmitting transaction data securely through the communication path using the perishable transaction token;

validating, by each intermediate node along the communication path, the perishable transaction token to ensure the authenticity and integrity of the transaction, verifying geographic location of the device complies with the geofencing restrictions specified in the tokenized request, and forwarding the transaction data to a subsequent node or the edge center;

splitting, by the quantum cloud orchestration system, the transaction data into multiple paths for transmission through the communication path to provide redundancy, and dynamically rerouting the transaction data in real time to avoid network congestion or node failure based on predictions made by artificial intelligence and machine learning algorithms;

receiving, by the edge center, the transaction data and processing the transaction based on the metadata and security requirements specified in the tokenized request;

sending, by the edge center, an acknowledgment of successful transaction completion back to the device through the communication path, wherein the acknowledgment includes a unique identifier associated with the perishable transaction token and a confirmation of compliance with the geofencing restrictions and regulatory requirements specified in the tokenized request; and destroying, by the edge center and each intermediate node, the perishable transaction token upon completion of the transaction, and logging token metadata in a secure ledger maintained by the quantum cloud orchestration system, wherein the ledger provides an immutable audit trail for transaction traceability and compliance verification.

12. A system for secure and efficient communication between a device and an edge center using a tokenized framework, the system comprising:

a device configured to generate a tokenized request when experiencing one or more of weak signal strength, high latency, or excessive energy consumption, wherein the tokenized request includes metadata specifying a transaction type, a geolocation determined using ultra-wide band (UWB) technology, a current network type, destination details, security requirements, device-specific parameters comprising battery level, processing capability, and storage capacity, and geofencing restrictions;

a quantum cloud orchestration system configured to:

analyze the metadata in the tokenized request to determine an optimal communication path from the device to the edge center, the optimal communication path being determined based on network availability, latency, device-specific parameters, and the capabilities of intermediate nodes;

pre-communicate transaction metadata to one or more intermediate nodes along the communication path to prepare the nodes for low-latency processing and secure data transmission;

generate an entry point token specifying an initial UWB-enabled node for establishing the communication path and a perishable transaction token encrypted using quantum-safe cryptographic algorithms, wherein the perishable transaction token contains encrypted metadata for authenticating and authorizing the transaction, and wherein the perishable transaction token is time-bound and expires after a predefined duration or upon completion of the transaction;

transmit the entry point token and the perishable transaction token to the device for use in initiating and conducting the transaction;

one or more intermediate nodes configured to:

validate the perishable transaction token to ensure authenticity and integrity of the transaction;

verify that a geographic location of the device complies with the geofencing restrictions specified in the tokenized request;

forward transaction data to subsequent nodes or the edge center through the communication path;

the device further configured to:

establish a connection to an identified initial UWB-enabled node using the entry point token, wherein the entry point token includes a timestamp indicating when the token becomes valid and an expiration time;

initiate the transaction by securely transmitting transaction data through the communication path using the perishable transaction token;

a quantum cloud orchestration system further configured to:

split transaction data into multiple paths for transmission through the communication path to provide redundancy;

dynamically reroute the transaction data in real time to avoid network congestion or node failure based on predictions made by artificial intelligence and machine learning algorithms; and an edge center configured to:

receive the transaction data and process the transaction based on the metadata and security requirements specified in the tokenized request;

send an acknowledgment of successful transaction completion back to the device through the communication path, wherein the acknowledgment includes a unique identifier associated with the perishable transaction token and a confirmation of compliance with the geofencing restrictions and regulatory requirements specified in the tokenized request;

destroy the perishable transaction token upon completion of the transaction and log token metadata in a secure ledger maintained by the quantum cloud orchestration system, wherein the ledger provides an immutable audit trail for transaction traceability and compliance verification.

13. The system of claim 12, wherein the quantum cloud orchestration system further predicts potential latency issues or bottlenecks along the communication path based on historical and real-time network performance data.

14. The system of claim 13, wherein the device is further configured to adaptively adjust its power consumption based on recommendations provided by the quantum cloud orchestration system to optimize energy efficiency during the transaction.

15. The system of claim 14, wherein the perishable transaction token includes additional metadata for dynamic priority levels, allowing the quantum cloud orchestration system to prioritize the transaction based on criticality.

16. The system of claim 15, wherein the one or more intermediate nodes are equipped with secure enclaves for token validation, ensuring that sensitive transaction data is protected against unauthorized access and tampering.

17. The system of claim 16, wherein the communication path determined by the quantum cloud orchestration system includes fallback paths that are activated in real time if a primary path experiences failure or congestion.

18. The system of claim 17, wherein the edge center is further configured to generate a detailed compliance report summarizing transaction adherence to geofencing and regulatory requirements specified in the tokenized request.

19. The system of claim 18, wherein the secure ledger maintained by the quantum cloud orchestration system uses distributed ledger technology to provide decentralized and immutable storage of token metadata for enhanced traceability.

20. The system of claim 19, wherein the quantum cloud orchestration system dynamically adjusts the expiration duration of the perishable transaction token based on the real-time conditions of the communication path and the security requirements of the transaction.

* * * * *